(12) United States Patent
Kinzel et al.

(10) Patent No.: US 6,624,760 B1
(45) Date of Patent: Sep. 23, 2003

(54) MONITORING SYSTEM INCLUDING AN ELECTRONIC SENSOR PLATFORM AND AN INTERROGATION TRANSCEIVER

(75) Inventors: Robert L. Kinzel, Livermore, CA (US); Larry R. Sheets, Lee's Summit, MO (US)

(73) Assignees: Sandia National Laboratories, Livermore, CA (US); Honeywell Federal Mfg. & Technologies, LLC, Kansas City, MO (US)

( * ) Notice: Subject to any disclaimer, the term of this patent is extended or adjusted under 35 U.S.C. 154(b) by 548 days.

(21) Appl. No.: 09/584,763

(22) Filed: May 30, 2000

(51) Int. Cl.$^7$ ............................................. G08C 19/04
(52) U.S. Cl. ............. 340/870.11; 340/539; 340/870.16; 340/632; 340/870.07; 361/600
(58) Field of Search ........................... 340/870.11, 539, 340/632, 870.16, 870.17, 870.07; 343/702; 361/600, 679

(56) References Cited

U.S. PATENT DOCUMENTS

| | | | | |
|---|---|---|---|---|
| 5,467,083 A | * | 11/1995 | McDonald et al. | 340/854.6 |
| 5,871,451 A | * | 2/1999 | Unger et al. | 600/509 |
| 5,919,141 A | * | 7/1999 | Money et al. | 600/513 |
| 6,028,555 A | * | 2/2000 | Harano | 343/702 |
| 6,049,273 A | * | 4/2000 | Hess | 340/539 |
| 6,167,258 A | * | 12/2000 | Schmidt et al. | 455/419 |
| 6,252,510 B1 | * | 6/2001 | Dungan | 340/632 |
| 6,300,871 B1 | * | 10/2001 | Irwin et al. | 340/539 |
| 6,342,843 B1 | * | 1/2002 | Hahn et al. | 340/825.69 |
| 6,469,639 B2 | * | 10/2002 | Tanenhaus et al. | 340/870.16 |
| 6,492,601 B1 | * | 12/2002 | Cain et al. | 177/210 R |

* cited by examiner

Primary Examiner—Michael Horabik
Assistant Examiner—Albert K. Wong
(74) Attorney, Agent, or Firm—L. E. Carnahan; T. P. Evans

(57) ABSTRACT

A wireless monitoring system suitable for a wide range of remote data collection applications. The system includes at least one Electronic Sensor Platform (ESP), an Interrogator Transceiver (IT) and a general purpose host computer. The ESP functions as a remote data collector from a number of digital and analog sensors located therein. The host computer provides for data logging, testing, demonstration, installation checkout, and troubleshooting of the system. The IT transmits signals from one or more ESP's to the host computer to the ESP's. The IT host computer may be powered by a common power supply, and each ESP is individually powered by a battery. This monitoring system has an extremely low power consumption which allows remote operation of the ESP for long periods; provides authenticated message traffic over a wireless network; utilizes state-of-health and tamper sensors to ensure that the ESP is secure and undamaged; has robust housing of the ESP suitable for use in radiation environments; and is low in cost. With one base station (host computer and interrogator transceiver), multiple ESP's may be controlled at a single monitoring site.

12 Claims, 3 Drawing Sheets

MONITORING SYSTEM INCLUDING AN ELECTRONIC SENSOR PLATFORM AND AN INTERROGATION TRANSCEIVER

STATEMENT OF GOVERNMENT INTEREST

The United States Government has rights in this invention pursuant to Contract No. DE-AC04-94AL85000 between the United States Department of Energy and the Sandia Corporation for the operation of the Sandia National Laboratories.

BACKGROUND OF THE INVENTION

The present invention relates to monitoring systems, particularly to wireless monitoring systems utilizing remote sensors, and more particularly to a wireless monitoring system which includes a base station composed of a host computer and an interrogation transceiver, and one or more electronic sensor platforms, each including a variety of binary and analog, internal and external sensors.

With the rapid dismantlement of nuclear weapons production in the United States as well as in other countries, the stored nuclear material inventories around the world have grown at a disproportionate rate. To ensure the safety, security, and accountability of the material, a plutonium management system is needed. One such system under development is the Materials Monitoring System (MMS) being developed by Sandia National Laboratories, which is a pilot system to demonstrate a flexible, site-independent system to remotely monitor the stored nuclear materials and other high value assets. The MMS integrates the collection, processing, and dissemination of information regarding high value materials, such as plutonium, during processing, transportation and long-range storage thereof, for domestic and international safeguards and treaty verification. The initial purpose of the MMS is to deliver the right sensor data to the right user around the world and account for the nuclear material in near real-time. As noted however, the system is equally applicable to any high value asset which requires continuous monitoring and surveillance.

The MMS incorporates numerous site or location sub-systems which interface with the overall MMS whereby information from each sub-system can be integrated into the overall MMS. This is accomplished by the present invention which comprises a sub-system monitor and utilizes a host computer which functions at the MMS interface, with invention comprising an Interrogator Transceiver (IT), and one or more Electronic Sensor Platforms (ESP's) which include a variety of sensors. The IT interrogates, or submits requests, for data in individual ESP's and receives the resulting data supplies by the ESP's, the requests being received from the host computer and the resulting data supplied to the host computer. A supporting component is a code written to perform the system control and management functions, which code is not part of the present invention and thus is not described in greater detail. The two principle components of the recent invention are the IT and the ESP's. Each ESP includes a variety of internal and external sensors, and is capable of controlling other devices as well as incorporating the data from these other sensors into its data stream. The sensor mix is designed to provide the maximum flexibility while providing key attributes of the state of health of the ESP itself. The ESP's communicate with the IT over a Radio Frequency (RF) link, allowing many ESP's to be remotely positioned around a facility; this wireless monitoring system allows the user to collect data with minimal impact on normal facility operation. Furthermore, the RF messages are authenticated so that the user has high confidence that the received data has not been altered and that the ESP has not been spoofed, tampered with or damaged.

SUMMARY OF THE INVENTION

It is an object of the present invention to provide for remote monitoring of nuclear materials and other high value assets.

A further object of the invention is to provide a wireless monitoring system which includes one or more electronic sensor platforms, each utilizing a variety of sensors.

A further object of the invention is to provide a wireless monitoring system which includes one or more Electronic Sensor Platforms (ESP's) and an Interrogator Transceiver (IT) for transmitting data between the one or more ESP's and a host computer.

Another object of the invention is to provide a monitoring system wherein the ESP's communicate with the IT over an RF link, enabling many ESP's to be remotely positioned, and the RF messages are authenticated so that the user has high confidence that the received data has not been altered.

Another object of the invention is to provide a monitoring system which includes at least one ESP whose primary function is to check internal and/or external security or accountability sensors and report any changes of state of these sensors.

Another object of the invention is to provide an ESP which has the capability to gather sensor data from internal and/or external sensors and transmit these data at programmed state of health intervals or when polled by a request for data.

Another object of the invention is to provide an ESP which includes status sensors, tamper indicating detectors, and expansion ports, and which communicates data from these sensors or detectors with an interrogator transceiver over an RF link.

Other objects and advantages of the present invention will become apparent from the following description and accompanying drawings. Basically the invention involves one or more ESP's and an IT operatively connected to a host computer of an overall monitoring system. The ESP's, IT, and host computer comprise a wireless monitoring system suitable for a wide range of remote data collection applications. Each of the ESP's is battery powered and support a variety of internal and external sensors, and is capable of controlling other devices as well as incorporating the data from these other sensors into its data stream. The sensor mix provides the maximum flexibility while providing key attributes of the state of health of the ESP itself. The ESP sensors include status sensors and tamper indicating detectors, with the status sensors indicating temperature, battery voltage, and transportation mode indication; with the tamper detectors including a fiber optic seal, a motion sensor, and case tamper switches. In addition, each ESP includes undedicated ports which are available for a wide range of user applications. The one or more ESP's communicates with the IT over an RF link, allowing the ESP's to be remotely positioned. The RF messages are authenticated using an appropriate encryption algorithm so that the user has high confidence that the received data has not been altered and that the ESP has not been spoofed, tampered with or damaged. Thus, the present invention provides a wireless sub-system integrated with an overall material monitoring system, which is particularly applicable for the monitoring of any high value asset during processing, transportation, and storage thereof.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

The present invention is directed to a wireless monitoring system which includes an Interrogator Transceiver (IT) and one or more Electronic Sensor Platforms (ESP), with the IT operatively connected to a host computer which is an interface to a materials monitoring system, particularly adapted for monitoring the processing, transportation, and storage of high value assets. The basic function of the IT is to transmit to, or receive from, data, requests, etc., from the host computer and to transmit to, or receive, signals, data, etc., from the one or more ESP's. The ESP, the IT, and the general purpose host computer comprise a wireless monitoring system suitable for a wide range of remote data collection applications. This monitoring system has the following unique features: 1) extremely low power consumption which allows remote operation of the ESP's for long periods, 2) authenticated message traffic over a wireless network, 3) state-of-health and tamper sensors to ensure that the ESP is secure and undamaged, 4) robust housing of the ESP suitable for use in radiation environments, and 5) low cost. Thus, with one base station (i.e., one host computer and one IT), multiple ESP's may be controlled at a single monitoring site.

Figure 1:
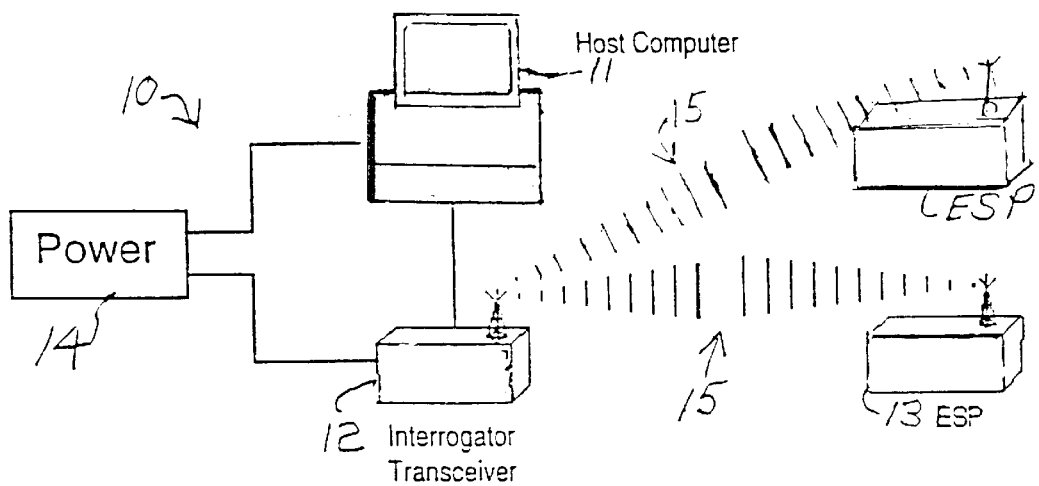
FIG. 1 schematically illustrates an embodiment of the wireless monitoring system made in accordance with the present invention.

The wireless monitoring system of this invention as shown in FIG. 1 and generally indicated at 10 comprises a host computer 11, an IT 12, and a plurality of ESP's 13, with the host computer 11 and IT 12 being powered by a power supply 14, (i.e., 110 Vac, 60 Hz) with each ESP being individually powered, such as by a battery, (i.e., 3.6 VDC), and with the IT and ESP's communicating over RF links indicated at 15, whereby the ESP's can be remotely located.

Each ESP 13 supports a variety of internal and external sensors. The primary function of the ESP is to check internal and/or external security or accountability sensors and report any changes of state of these sensors. It also has the capability to gather sensor data from internal and/or external sensors and transmit these data at programmed state-of-health intervals or when polled via the host computer and IT by an overall Material Monitoring System (MMS). That information is transmitted via RF to the IT for processing by the host computer of the MMS. After this information is processed, the state-of-health of stored materials can be immediately assessed by an end user. Thus, the ESP is capable of enhancing the safety, security, and accountability of any high value asset The ESP can be used in a variety of applications depending on the suite of sensors monitored. There are two categories of sensors: 1) those used for security of the ESP and for maintaining continuous accountability data for the item that is being monitored; and 2) those used for material state-of-health monitoring. The purpose of the internal security and accountability sensors is to detect movement of and/or tampering with the stored materials and/or the ESP itself.

The suite of internal security/accountability sensors comprises a fiber optic seal, motion detection circuitry, case tamper switches, and high and low internal temperature indicators. The fiber optic seal is a fiber optic cable that can be used to seal bolts and other closures of storage containers to make it difficult to open the container without removing or breaking the fiber. The motion detection circuitry reports any attempts to move or tamper with the container and/or ESP. The motion sensor is designed to provide a trigger for other, complementary security systems such as video cameras rather than to provide direct indication of a tampering event. Case tamper switches report any attempt to open the ESP. High and low-internal temperature sensors detect any attempt to disable the ESP by exposing it to extreme temperatures. The ESP also supports controlling and monitoring of external devices using on-board input and output channels.

Also the ESP includes status sensors, such as for the temperature of internal ESP electronics, battery voltage which provides a heads-up to the user regarding required maintenance, and a transportation mode indicator which allows shipment of items being monitored, i.e., motion sensor is disregarded and messages are buffered in case of communication disruption.

In addition the ESP may include expansion ports (undedicated ports available for a wide range of user applications). In one embodiment of the ESP, these expansion ports include: two analog ports, two digital ports, and three digital input/output control ports (for controlling external equipment).

Figure 2:
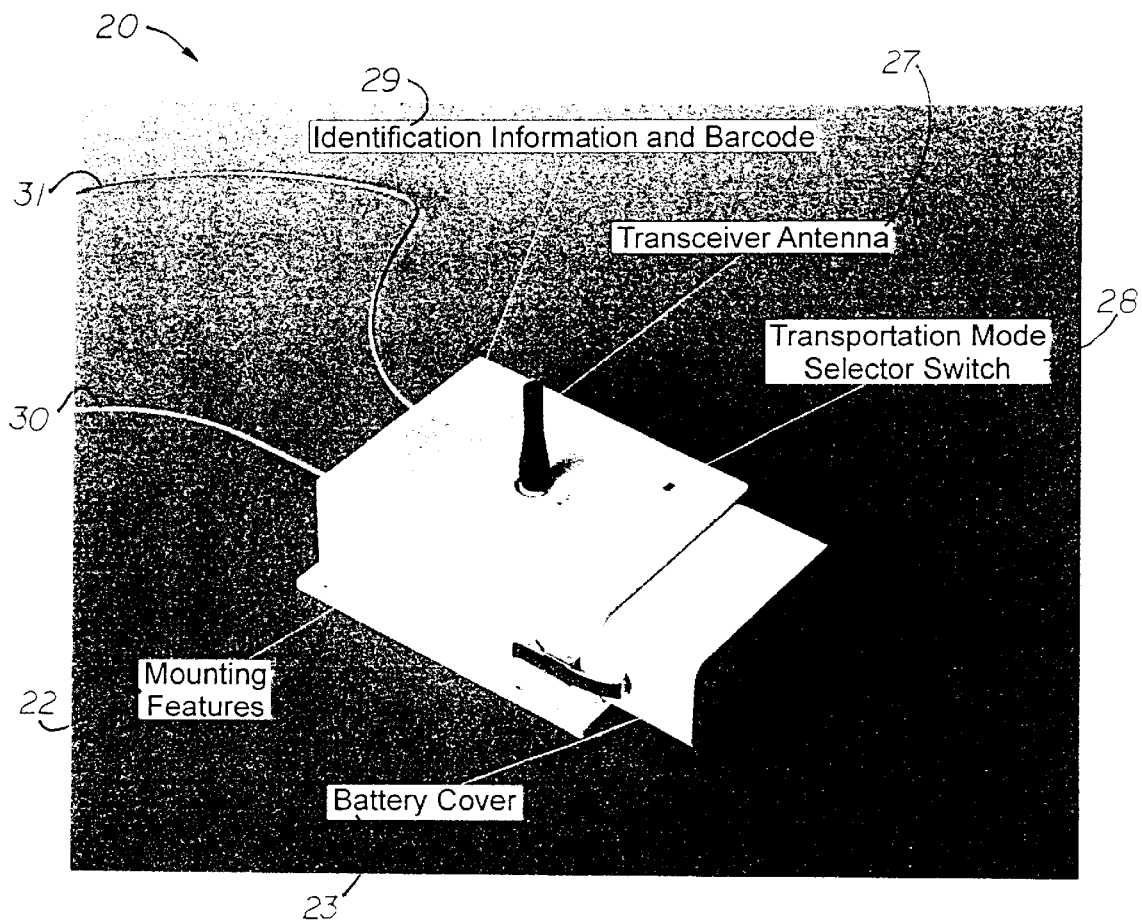
FIG. 2 illustrates an embodiment of an ESP of the FIG. 1 monitoring system.

FIG. 2 illustrates an embodiment of an ESP mode in accordance with the present invention. As shown, the ESP 20 includes a housing or casing 21 removably secured to a mounting feature or member 22 and having a battery cover 23 mounted to one end by clips or spring latched 24, only one shown. On top casing 21 are two openings 25 and 26, with a transceiver/antenna 27 mounted through opening 25 and a transportation mode selector switch 28 extending through opening 26. The top of casing 21 is provided with identification information and barcode indicated at 29. A pair of cables 30 and 31 extend from casing 21 to a point of use.

Figure 3:
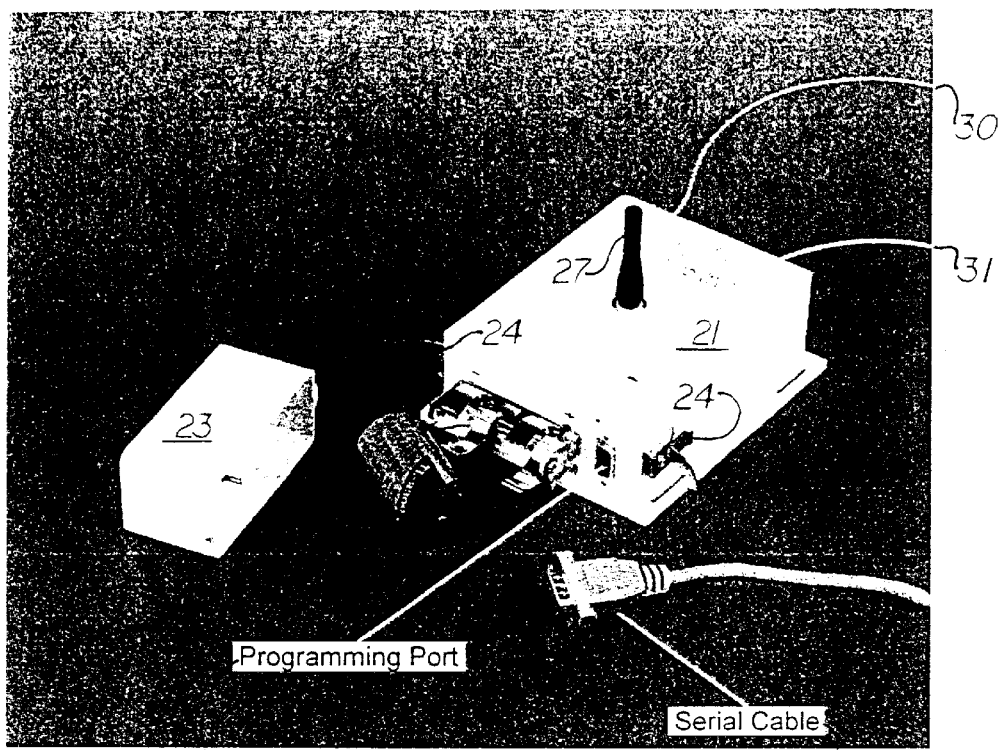
FIG. 3 illustrates a view of the ESP of FIG. 1 with the battery cover removed for ESP programming by the host computer.

The battery cover 23 contains a power supply, such as a 3.6 Vdc lithium thionyl chloride battery 32, as seen in FIG. 3. The ESP includes a large capacitor used to maintain power during battery replacement. Such batteries have a shelf life of at least 10 years.

The ESP is programmed prior to use by ESP Programming software installed in the host computer, and the programming is carried out using a standard serial cable connected to a cable mount on the side of the ESP as shown in FIG. 3. As seen in FIG. 3, wherein the battery cover 23 is removed from casing 21 exposing the battery, the casing 21 including a programming port 33 to which a serial cable 34 is mounted during programming of the ESP, the cable 34 being connected to the host computer 11 of FIG. 1.

Each of the ESP's 13 has two communication modes. The serial programming port 33 allows the user to program the ESP prior to use, e.g., enter an authentication key, enable or disable various sensors within the ESP, adjust sensor reporting intervals, etc. The RF transceiver 27 allows two-way communication with the IT 12. The RF message protocol is a custom format developed to minimize message length and thereby reduce the RF communications bandwidth and power consumption.

As pointed out above, each ESP has multiple internal sensors and the capability to interface to other external sensors. These sensors can be categorized as binary and analog. Binary sensors include: fiber optic seal motion, high temperature, low temperature, case tamper, transportation mode indicator, and any external sensors connected to the digital ports. Analog sensors include: temperature, battery voltage, and any external sensors connected to the analog ports.

The ESP digitizes the analog sensor readings with an 8-bit analog-to-digital converter. The analog sensors can be programmed with both high and low thresholds, such that the ESP will generate an event of the reading is outside the threshold.

The ESP generates messages in two modes: 1) when polled by the IT, and 2) automatically. Via the host computer and the IT, the user can poll any ESP at any time to determine its current state. Three types of polling requests are available: 1) polled state-of-health (PSOH), 2) verbose state-of-health (VSOH), and 3) buffer dumps. When a PSOH is requested, the return message is the same as the normal state-of-health (SOH) message sent by the ESP at regular intervals as configured by the user. The VSOH messages contain detailed information on the ESP's internal state, including data of the ESP's history. The buffer dump command instructs the ESP to dump its message buffer (100 messages maximum); this command is only available if the ESP has been put into transportation mode.

The ESP's automatic messages are generated in two ways: 1) at a regularly scheduled interval, and 2) when events are detected. An "event" is defined as a change of state in a binary sensor, or an analog channel crossing a high or low threshold. In all cases, the event is generated when the state change is first detected, and again when the event condition ends. For example, if an ESP detects an open fiber optic seal, it sends an event message to the IT. While the fiber optic seal may remain open for an extended time, the ESP does not generate any more fiber optic seal related events until the fiber optic seal closes. Between these two events, the ESP may generate state-of-health messages or other event messages, but it does not transmit repeated fiber optic seal open event messages.

The ESP has two operating modes: normal and transportation mode. In transportation mode, the internal motion detector is ignored, and the message buffer is enabled for message retrieval. A copy of each message transmitted is stored in the buffer. The buffer operates in a First In—First Out (FIFO) mode (i.e., the first message stored is transmitted first). The buffer has capacity for about 100 messages; the storage operates as a ring buffer where the oldest message is over-written with the most recent.

The buffer can be read only when the ESP is in transportation mode, and receives the buffer dump command. It sends messages continuously, from the oldest message to the newest. It is possible for the ESP to generate a new event or send a SOH message in the middle of the buffer dump. In this case, the buffer message stream is interrupted long enough to send the new message and the buffer dump operation resumes immediately afterwards.

The ESP spends most of its time in a low-power mode. It checks the other sensors and listens for a wakeup message transmission from the IT at a rate of 1 Hz. If a wakeup is detected, then the ESP stays awake to wait for a polling request.

The ESP can authenticate its message transmissions. It uses an approved encryption algorithm to generate a signature that is appended to the end of each message. This capability ensures that an unauthorized user cannot interface with data collection by sending undetected bogus messages or prerecorded ESP messages. The ESP has a serial port for securely downloading an authentication key when a unit is first configured for use.

Figure 4:
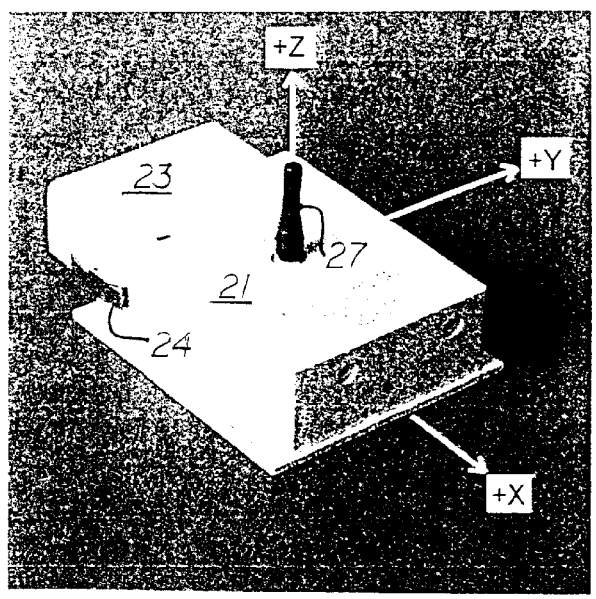
FIG. 4 illustrates the ESP of FIG. 2 showing the principal axes thereof.

FIG. 4 illustrates the principal axes of the ESP of FIG. 2. Signals to and from the antenna 27 are in an X, Y, and/or Z plane whereby signals from any direction may be received or signals may be sent in any direction.

Figure 5:
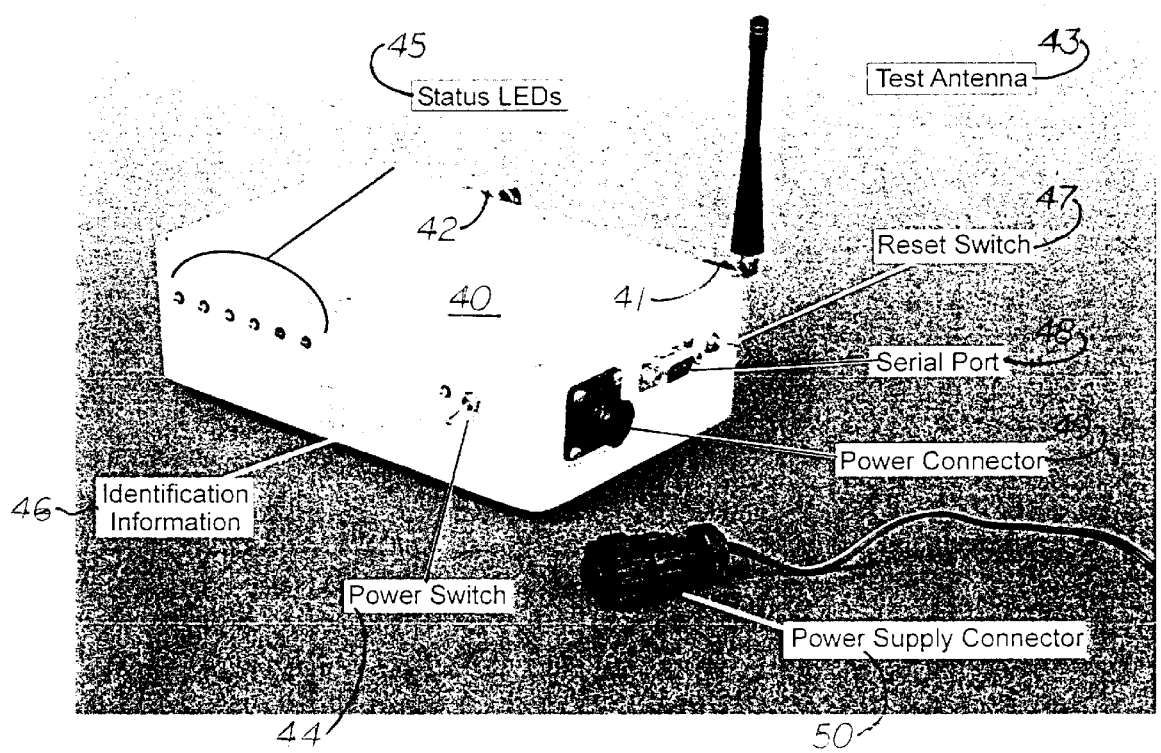
FIG. 5 illustrates an embodiment of the interrogator transceiver of the FIG. 1 monitoring system.

An embodiment of the IT is illustrated in FIG. 5. As shown in FIG. 1, the IT is the interface between one or more ESP's and a host computer system. The IT converts the ESP's RF message data into serial data for the host computer. The IT also converts instructions from the host computer into the custom RF format used by the ESP's. The IT connects to the host computer via a serial cable, and, for example, requires 110 VAC, 60 Hz power. As shown in FIG. 5, the IT includes a housing or casing 40 having on one side wall two antenna ports 41 and 42 with an antenna 43 connected to port 41 and on the opposite side wall a power switch 44, status Laser Emitting Diodes (LEDs) 45, and identification information 46. Located on the end wall is a reset switch 47, a serial port 48, and a power connector port 49 which is adapted to be connected to a power supply cable or connector 50 connected to power supply 14 of FIG. 1. Serial port 48 is connected by a serial cable, such as shown in FIG. 3, to host computer 11 of FIG. 1, whereby the ESP's RF messages after being converted to serial data by the IT are transmitted to the host computer.

The ESP's and IT form the basis of a powerful remote monitoring system suitable for a wide range of commercial applications, which include:

1. inventory management and security of high value items;
2. monitoring of high value or hazardous items during shipment;
3. remote data collection form disperse points in a factory, warehouse, or industrial site with no need to alter the existing structure; and
4. remote data collection from harsh environments inimical to human beings, e.g., toxic atmosphere or ionizing radiation.

The ESP is inherently flexible and each ESP can be programmed to support a different set of internal and external sensors without change to the basic design. The user's external sensor designs are only constrained by the minimal interface requirements of the ESP's extra analog and digital ports. In addition, the ESP is capable of controlling additional external devices via the three digital input/output port.

For remote sensor data collection applications not requiring the ESP's security features, the tamper detectors can be disabled in software when programmed by the host computer, thus reducing the ESP's baseline power consumption. For future ESP's for a specific customer, the security features can simply be omitted from the ESP. Currently the primary interest in the ESP/IT system is for treaty verification, cargo monitoring, and long-range storage of nuclear materials by governmental and other international agencies.

While the ESP's may be configured for a variety of internal and/or external sensors for a variety of sensor/ detection applications, the sensor mix described hereinafter provides the maximum flexibility while providing key attributes of the state-or-health of the ESP itself. The following sensors are supported:

1. Digital Sensors:
    1. Fiber Optic Seal
    The fiber optic seal is designed to provide a reliable way of detecting attempts to open sealed containers and to provide a method of continuously maintaining accountability records for that container.
    2. Motion Sensor
    The motion sensor is designed to provide a reliable method of triggering other external sensors, such as video surveillance systems, based on sensed motion of the container being monitored. The motion sensor is not intended to provide alarm or event data related to the monitored container, but can serve as a means of selecting future surveillance units based on past events or for providing confirmation of declared events, such as battery changes or material movements.
    3. High/Low Temperature Tamper Indicator
    The high/low temperature sensors are designed to provide notification of thermal conditions beyond the design limits of the ESP.
    4. Transportation Mode Indicator
    The transportation mode indicator can be used to halt monitoring of the motion sensor when movement of the monitored container is required and to enable remote retrieval of sensor data stored inside the ESP accumulated during periods when the ESP was not in contact with an overall material monitoring system.
    5. Case Tamper Indicator
    Case tamper switches are used to indicate attempts to open the ESP housing. The ESP can also be programmed to destroy internally-stored data authentication keys when a switch opening is detected.
    6. Three Digital Input/output Control Ports:
    These ports can be programmed to control and/or monitor external devices.
II. Analog Sensors:
    1. Temperature
    This sensor can be used to monitor the storage environment or used with an external sensor to measure temperatures associated with the stored material.
    2. Battery Voltage
    This sensor provides a method of determining the remaining life of the ESP. This sensor can also be programmed to generate an event indicating that the ESP battery requires changing for in advance of unit failure to permit maintenance scheduling.
    3. Two additional Analog Ports
    These ports can be used to provide a capability of monitoring external analog channels.

The design parameters of the transceiver/antenna 27 of the ESP of FIG. 2 were chosen to guarantee reliable communication in the use environment while minimizing RF levels as well as power consumption, and includes a transmitter unit and a receiver unit. The transmitter unit is a miniature transmitter module, such as an HX2000 made by RF Monolithics, Inc., that generates On-Off Keyed (OOK) modulation from an external digital encoder. The transmitter is designed specifically for unlicensed remote-control, wireless security, and data-link transmitters, such as operating in the USA under FCC Part 15.249 and in Canada under TRS RSS-210. The receiver unit is based on several technologies that allow good performance in a small module.

While various components of an embodiment of the ESP and IT have been described above and/or illustrated in the drawing, details of the various components are set forth in "Materials Monitoring Systems: RF-Based Electronic Sensor Platform," R. L. Kinzel, Jun. 10, 1999.

It has thus been shown that the present invention provides a monitoring system which includes one or more ESP's and an IT, the IT being operatively connected to a host computer, which may be part of an overall materials monitoring system, having primary interest in monitoring the processing, transporting and storage of high value materials or merchandise. The ESP's are designed to support a variety of internal and external sensors, and each is capable of controlling other devices as well as incorporating the data from these other sensors into its datasystem. The sensor mix of the ESP's provide the maximum flexibility while providing key attributes of the state-of-health of the ESP itself. The ESP's communicate with the IT over an RF link, allowing many ESP's to be remotely positioned.

While a particular embodiment of the invention has been described and illustrated and particular sensors thereof have been described along with specific parameter to exemplify and teach the principles of the invention, such are not intended to be limiting. Modifications and changes may become apparent to those skilled in the art, and it is intended that the invention be limited only by the scope of the appended claims.

What is claimed is:

1. A monitoring system comprising: at least one electronic sensor platform, comprising:
    a plurality of sensors comprising at least a fiber optic seal sensor, a case tamper sensor, and a sensor to detect the condition of sensitive material proximate to said sensor platform;
    an RF transceiver for transmitting data from the plurality of sensors;
    a message buffer, in electronic communication with said plurality of sensors and said RF transceiver, wherein said message buffer periodically stores status data generated by each of said plurality of sensors;
    a source of electrical power operatively connected to each of said plurality of sensors, to said message buffer, and to said RF transceiver; and
    an interrogator transceiver constructed to communicate with any of said RF transceivers over an RF link; and
    a host computer operatively connected to send signals to and receive signals from said interrogator transceiver.

2. The system of claim 1, wherein said source of electrical power includes a direct current power supply.

3. The system of claim 1, wherein said plurality of sensors include at least one binary sensor and at least one analog sensor.

4. The system of claim 1, wherein said plurality of sensors further include a motion sensor, a high temperature sensor, a low temperature sensor, and a transportation mode indicator.

5. The system of claim 1, wherein said plurality of sensors include a battery voltage sensor.

6. The system of claim 1, wherein said at least one electronic sensor platform includes digital ports for connection to external sensors and analog ports for connection to external sensors.

7. The system of claim 1, wherein said at least one electronic sensor platform is programmed to generate messages in a first mode, wherein messages are generated when said at least one electronic sensor platform is polled by the interrogator transceiver, and in a second mode, wherein messages are automatically generated by said at least one electronic sensor platform.

8. The system of claim 7, wherein messages of said one mode include polled state-of-health, verbose state-of-health, and buffer dump.

9. The system of claim 7, wherein said automatic messages are generated in two ways: regularly scheduled intervals and detected events.

10. The system of claim 1, including a plurality of electronic sensor platforms, each adapted to be connected to said interrogator transceiver via an RF link and each individual powered by a direct current power supply.

11. The system of claim 1, wherein said interrogator transceiver is constructed to receive radio frequency signals from said at least one electronic sensor platform, convert the radio frequency signals into serial data, and transmit the serial data to a host computer, and vice versa.

12. The system of claim 1, including a plurality of stand-alone electronic sensor platforms, each connected to said interrogator transceiver by a radio frequency link.

* * * * *